(12) United States Patent
Choi

(10) Patent No.: US 12,017,531 B2
(45) Date of Patent: Jun. 25, 2024

(54) TRAVEL NOTIFICATION METHOD AND SYSTEM INCLUDING A HEAD-UP DISPLAY THAT DISPLAYS THE TRAJECTORY OF A VEHICLE

(71) Applicant: NAVER LABS CORPORATION, Seongnam-si (KR)

(72) Inventor: Hakseung Choi, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 106 days.

(21) Appl. No.: 17/660,155

(22) Filed: Apr. 21, 2022

(65) Prior Publication Data
US 2022/0242238 A1 Aug. 4, 2022

Related U.S. Application Data

(63) Continuation of application No. PCT/KR2020/012433, filed on Sep. 15, 2020.

(30) Foreign Application Priority Data

Oct. 24, 2019 (KR) .......................... 10-2019-0133203

(51) Int. Cl.
*B60K 35/00* (2024.01)
*G06T 11/20* (2006.01)
(Continued)

(52) U.S. Cl.
CPC ............ *B60K 35/00* (2013.01); *G06T 11/203* (2013.01); *B60K 35/23* (2024.01); *B60K 35/28* (2024.01);
(Continued)

(58) Field of Classification Search
None
See application file for complete search history.

(56) References Cited

U.S. PATENT DOCUMENTS

| 2016/0084661 A1 | 3/2016 | Gautama et al. |
| 2016/0090041 A1* | 3/2016 | Nagasawa ............ G06V 20/588 345/7 |

(Continued)

FOREIGN PATENT DOCUMENTS

| DE | 102013010818 A1 | 12/2013 |
| JP | 2013196359 A | 9/2013 |

(Continued)

OTHER PUBLICATIONS

Office Action issued in corresponding Japanese patent application No. 2022-517366, dated Apr. 4, 2023.

(Continued)

*Primary Examiner* — Patrick F Valdez
(74) *Attorney, Agent, or Firm* — Greer Burns & Crain Ltd.

(57) ABSTRACT

A travel information notification method includes generating an augmented reality object composed of a plurality of lines that indicate a virtual trajectory corresponding to at least a portion of a predicted travel path of a vehicle; providing the generated augmented reality object on a head-up display of the vehicle so that the plurality of lines display the virtual trajectory in association with the road on which the vehicle is traveling; and providing travel information about the vehicle by controlling at least one among the spacing, colors, or shapes of the plurality of lines, displayed as the augmented reality object on the head-up display, according to travel conditions of the vehicle.

18 Claims, 16 Drawing Sheets

(51) Int. Cl.
*B60K 35/23* (2024.01)
*B60K 35/28* (2024.01)
*B60K 35/81* (2024.01)

(52) U.S. Cl.
CPC ........ *B60K 35/81* (2024.01); *B60K 2360/166* (2024.01); *B60K 2360/168* (2024.01); *B60K 2360/177* (2024.01)

(56) References Cited

U.S. PATENT DOCUMENTS

| | | | |
|---|---|---|---|
| 2017/0154554 A1* | 6/2017 | Tanaka | G08G 1/166 |
| 2018/0244153 A1* | 8/2018 | Ejiri | B60R 1/002 |
| 2018/0306597 A1 | 10/2018 | Kosaka et al. | |
| 2018/0370567 A1* | 12/2018 | Rowell | B62D 15/0295 |
| 2019/0317600 A1* | 10/2019 | White | G01C 21/3647 |
| 2020/0116518 A1* | 4/2020 | Lee | G06F 3/013 |
| 2020/0284605 A1* | 9/2020 | Sakai | G01C 21/10 |

FOREIGN PATENT DOCUMENTS

| | | |
|---|---|---|
| JP | 2014213763 A | 11/2014 |
| JP | 2017013671 A | 1/2017 |
| JP | 2018169169 A | 11/2018 |
| JP | 2019012236 A | 1/2019 |
| JP | 2019053596 A | 4/2019 |
| JP | 2019059248 A | 4/2019 |
| JP | 2019163037 A | 9/2019 |
| KR | 1020060058215 A | 5/2006 |
| KR | 1020160029456 A | 3/2016 |
| KR | 1020170065083 A | 6/2017 |
| KR | 102006158 B1 | 8/2019 |
| WO | 2011108091 A1 | 9/2011 |
| WO | 2018140022 A1 | 8/2018 |

OTHER PUBLICATIONS

ISR issued in PCT/KR2020/012433, dated Nov. 30, 2020.
Search report issued in corresponding European patent application No. 20878179.9, dated Oct. 5, 2023.

* cited by examiner

TRAVEL NOTIFICATION METHOD AND SYSTEM INCLUDING A HEAD-UP DISPLAY THAT DISPLAYS THE TRAJECTORY OF A VEHICLE

CROSS-REFERENCE TO RELATED APPLICATIONS

This is a continuation application of International Application No. PCT/KR2020/012433, filed Sep. 15, 2020, which claims the benefit of Korean Patent Application No. 10-2019-0133203, filed Oct. 24, 2019.

BACKGROUND OF THE INVENTION

Field of Invention

One or more example embodiments of the following description relate to a driving information guidance method and system, and more particularly, to a driving information guidance method and system based on an augmented reality (AR) and a head-up display (HUD).

Description of Related Art

There are various technologies for guiding driving information of a vehicle. For example, a vehicular driving information notification device and method using a head-up display (HUD) is disclosed in Korean Patent Laid-Open Publication No. 10-2006-0058215.

SUMMARY OF THE INVENTION

One or more example embodiments relate to a driving information guidance method and a system that may provide a variety of information about driving of a vehicle using an augmented reality (AR) object corresponding to a driving path displayed on a head-up display (HUD) more intuitively and realistically than an existing navigation environment.

According to an aspect of at least one example embodiment, there is provided a driving information guidance method of a computer apparatus having at least one processor, the driving information guidance method including, by the at least one processor, generating an augmented reality (AR) object including a plurality of lines representing a virtual trajectory corresponding to at least a portion of an expected driving path of a vehicle; providing the generated AR object such that the plurality of lines expresses the virtual trajectory on a head-up display of the vehicle in association with a road on which the vehicle travels; and providing driving information of the vehicle by controlling at least one of spacing, a color, and a shape for the plurality of lines displayed as the AR object on the head-up display according to a driving condition of the vehicle.

According to one aspect, the generating of the AR object may include generating the plurality of lines to express the virtual trajectory matching the road on which the vehicle travels when the plurality of lines is displayed on the head-up display, using information of a high definition (HD) map about the road on which the vehicle travels.

According to another aspect, the providing of the driving information of the vehicle may include controlling a spacing between the plurality of lines according to a driving speed of the vehicle.

According to still another aspect, the providing of the driving information of the vehicle may include controlling displaying of the plurality of lines such that a spacing between the plurality of lines is relatively narrowed according to an increase in a driving speed of the vehicle and the spacing between the plurality of lines is relatively widened according to a decrease in the driving speed of the vehicle.

According to still another aspect, the providing of the driving information of the vehicle may include controlling adjustment of a spacing between the plurality of lines such that the plurality of lines is displayed within a lane in which the vehicle is traveling on the head-up display.

According to still another aspect, the providing of the driving information of the vehicle may include controlling a spacing between the plurality of lines based on a width of a perceived road using at least one of an advanced driver assistance system (ADAS) and an HD map.

According to still another aspect, the providing of the driving information of the vehicle may include dynamically setting a driving speed that matches a maximum spacing or a minimum spacing between the plurality of lines according to a maximum driving speed limit or a minimum driving speed limit of the road on which the vehicle travels.

According to still another aspect, the providing of the driving information of the vehicle may include linearly or nonlinearly controlling a spacing between the plurality of lines according to the driving speed based on the driving speed that matches the maximum spacing or the minimum spacing.

According to still another aspect, the providing of the driving information of the vehicle may include controlling displaying of the plurality of lines such that a color of the plurality of lines changes when a driving speed of the vehicle violates a regulation speed of the road on which the vehicle travels.

According to still another aspect, a plurality of colors between a first color and a second color may be pre-defined in gradation, and the providing of the driving information of the vehicle may include controlling the color of the plurality of lines to change in gradation from the first color to the second color through the plurality of colors and adjusting a speed at which the color is changed in gradation according to a change speed of the driving condition of the vehicle.

According to still another aspect, the providing of the driving information of the vehicle may include controlling the plurality of lines to be displayed in association with a lane in which the vehicle is traveling according to the expected driving path, and controlling displaying of the plurality of lines such that information about at least one of a lane bias and a lane departure of the vehicle is displayed using a left end line or a right end line among the plurality of lines.

According to still another aspect, the providing of the driving information of the vehicle may include forming an arbitrary space between the plurality of lines by changing a shape of at least one of the plurality of lines and controlling displaying of the plurality of lines such that turn-by-turn (TBT) information is displayed in the formed space, when displaying the TBT information according to driving of the vehicle.

According to still another aspect, the providing of the driving information of the vehicle may include dynamically setting at least one of a spacing between spaces formed between the plurality of lines and a number of spaces according to the driving speed of the vehicle to display the TBT information.

According to still another aspect, the providing of the driving information of the vehicle may include controlling displaying of the plurality of lines such that least one of the shape and the color for the plurality of lines changes according to a curvature of the road on which the vehicle travels, which is measured based on information of an HD map about the road on which the vehicle travels and an output value of a sensor included in the vehicle.

According to an aspect of at least one example embodiment, there is provided a computer program stored in a computer-readable storage medium to execute the driving information guidance method on a computer apparatus in combination with the computer apparatus.

According to an aspect of at least one example embodiment, there is provided a computer-readable record medium storing a computer program to implement the driving information guidance method on a computer apparatus.

According to an aspect of at least one example embodiment, there is provided a computer apparatus including a memory configured to store an instruction executable on a computer; and at least one processor configured to execute the instruction. The at least one processor is configured to cause the computer apparatus to generate an AR object including a plurality of lines representing a virtual trajectory corresponding to at least a portion of an expected driving path of a vehicle, to provide the generated AR object such that the plurality of lines expresses the virtual trajectory on a head-up display of the vehicle in association with a road on which the vehicle travels, and to provide driving information of the vehicle by controlling at least one of the spacing, the color, and the shape of the plurality of lines displayed as the AR object on the head-up display according to a driving condition of the vehicle.

According to some example embodiments, it is possible to guide a variety of information about driving of a vehicle using an augmented reality (AR) object corresponding to a driving path displayed on a head-up display (HUD) more intuitively and realistically than an existing navigation environment.

DETAILED DESCRIPTION OF THE INVENTION

Hereinafter, some example embodiments will be described with reference to the accompanying drawings.

A driving information guidance system according to the example embodiments may be implemented by at least one computer apparatus linked with a vehicle and a driving information guidance method according to the example embodiments may be performed through at least one computer apparatus included in the driving information guidance system.

Here, a computer program according to an example embodiment may be installed and executed on the computer apparatus, and the computer apparatus may perform the driving information guidance method according to the example embodiments under the control of the executed computer program. The computer program may be stored in a computer-readable storage medium to perform the driving information guidance method on a computer in conjunction with the computer apparatus.

A head-up display (HUD) refers to a display device that provides information related to a vehicle and/or driving of the vehicle by projecting a virtual image in a visible area of a driver and the driving information guidance method according to the example embodiments may provide driving information to the driver by displaying an AR object on the HUD.

Figure 1:
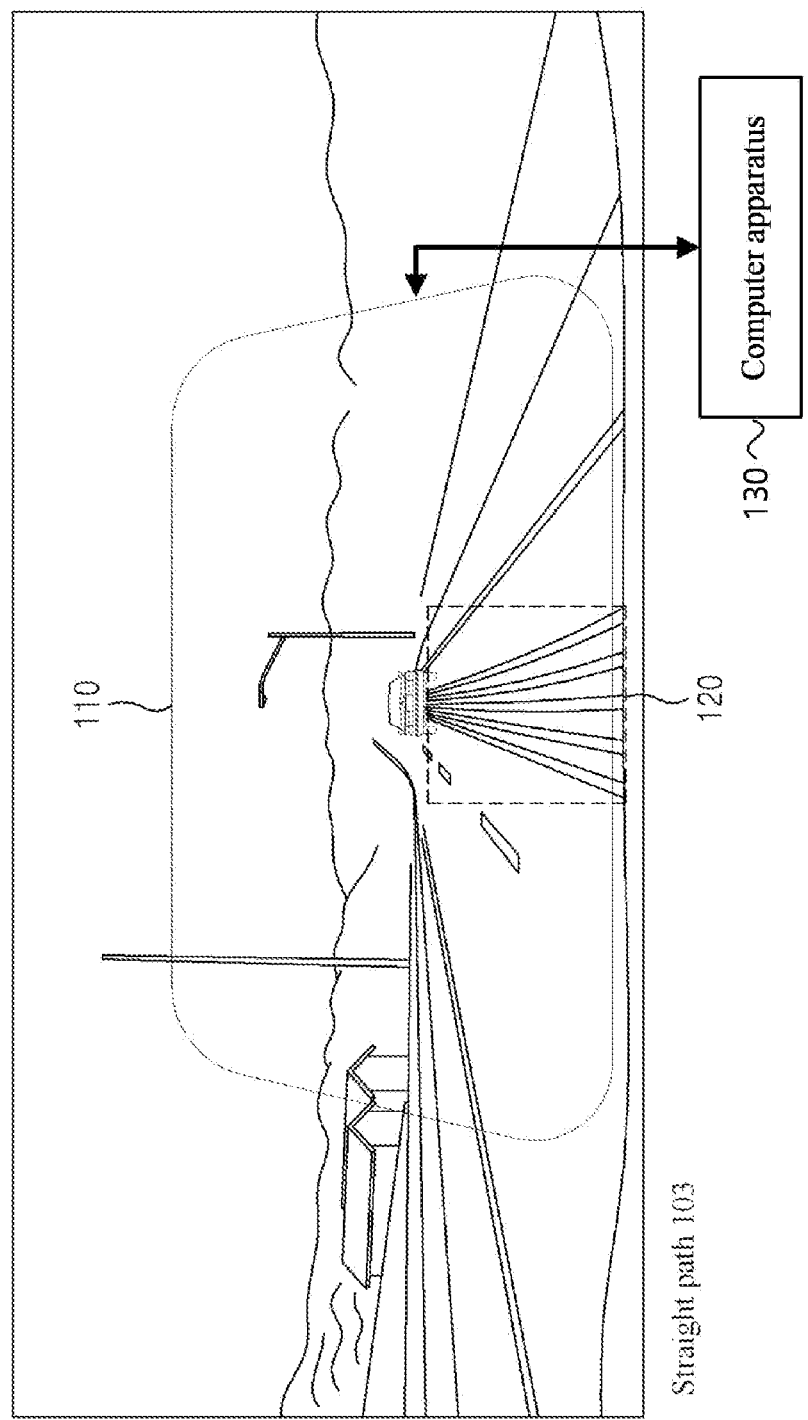
FIGS. 1 to 3 illustrate examples of displaying an augmented reality (AR) object on a head-up display (HUD) according to an example embodiment.
Figure 2:
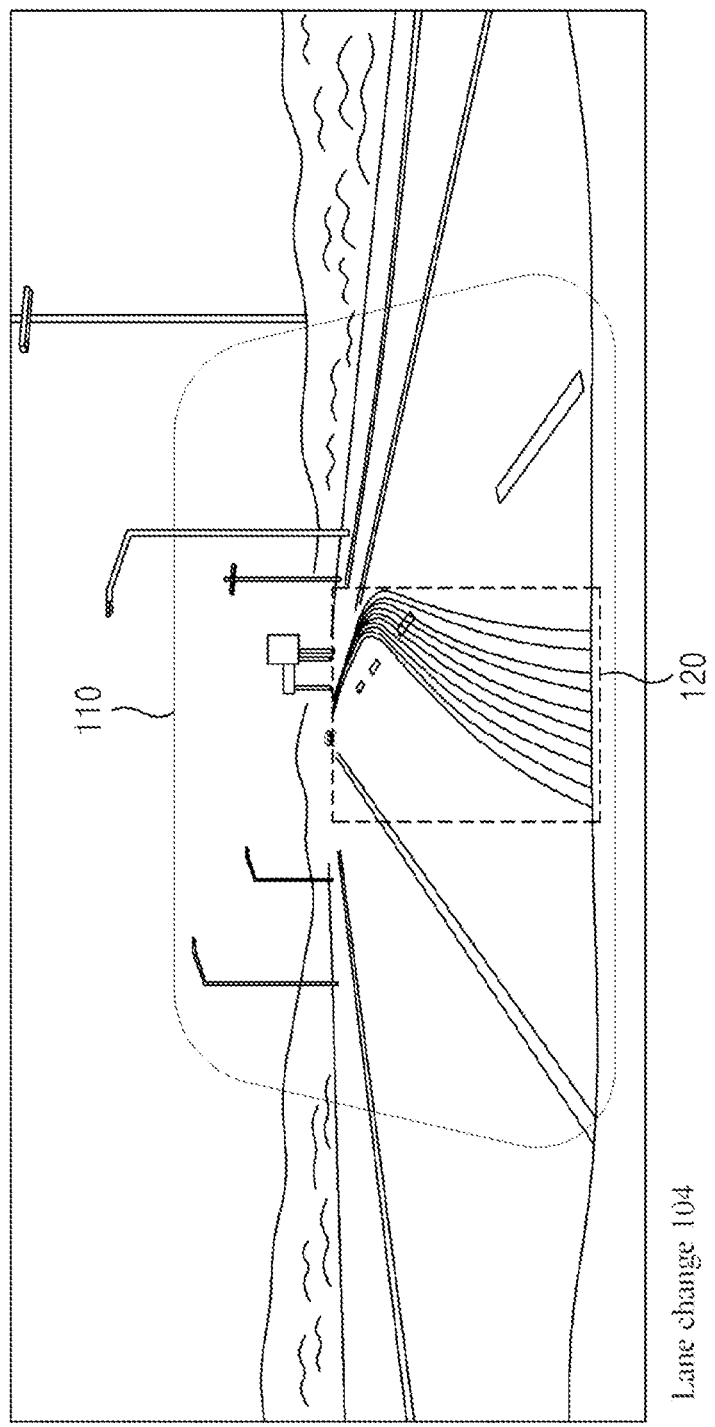
Figure 3:
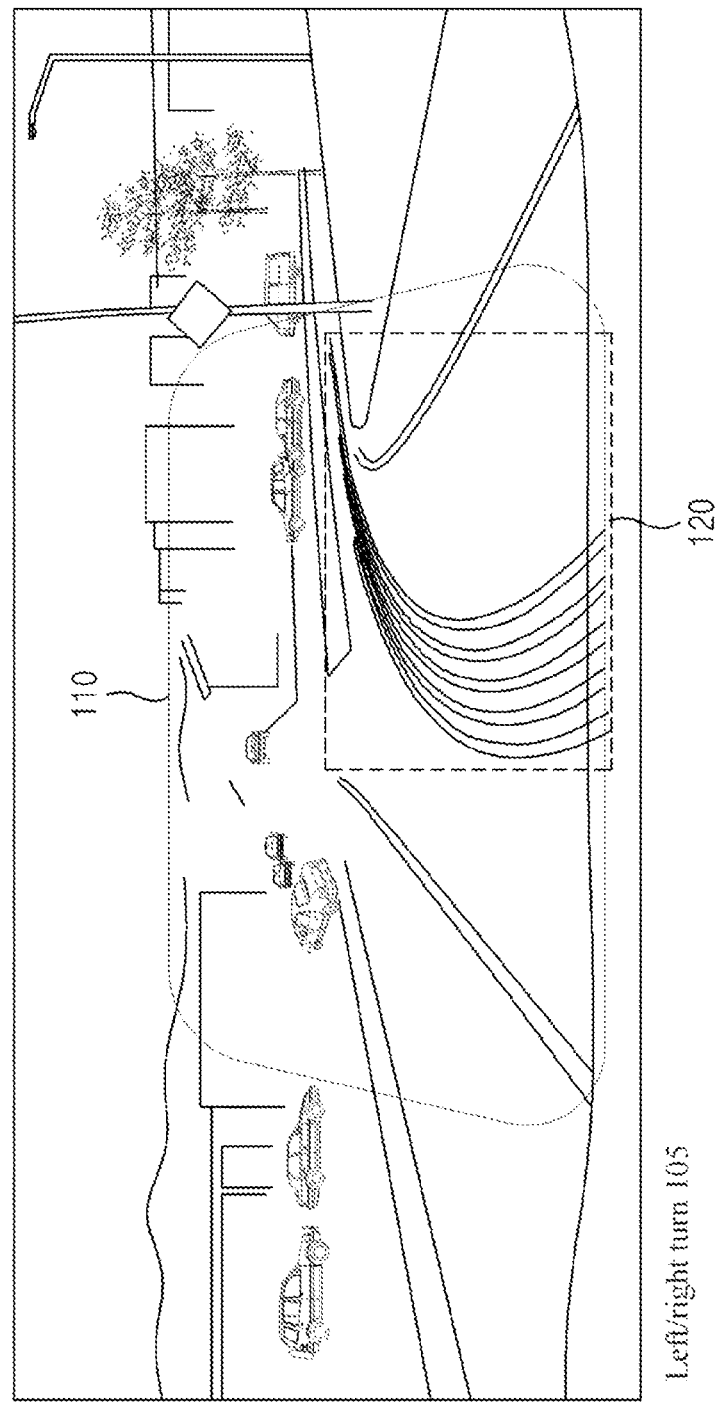

FIGS. 1 to 3 illustrate examples of displaying an augmented reality (AR) object on a HUD according to an example embodiment. FIGS. 1 to 3 illustrate examples of displaying an AR object including a plurality of lines through a display area 110 of a HUD installed on a windshield part of a vehicle.

Here, the plurality of lines relates to expressing a virtual trajectory corresponding to at least a portion of an expected driving path of the vehicle. FIG. 1 illustrates an example embodiment in which a virtual trajectory corresponding to a straight path 103 is expressed through five lines shown in a box 120 indicated with dotted lines, FIG. 2 illustrates an example embodiment in which a virtual trajectory corresponding to a path for a lane change 104 is expressed through five lines shown in the box 120 indicated with dotted lines, and FIG. 3 illustrates an example embodiment in which a virtual trajectory corresponding to a path for a left/right turn 105 through five lines shown in the box 120 indicated with dotted lines. Here, although the example embodiments of FIGS. 1 to 3 represent example in which five lines are used as the plurality of lines as the AR object, the number of lines may vary depending on example embodiments.

To express a virtual trajectory corresponding to at least a portion of an expected driving path through the plurality of lines, AR technology and a high definition (HD) map may be used. For example, a computer apparatus 130 may generate the plurality of lines to express a virtual trajectory matching the road on which the vehicle travels using information of the HD map about the road on which the vehicle travels, and may control the plurality of lines to be displayed by being matched to the road on which the vehicle travels using AR technology, when the plurality of lines is displayed through the display area 110 of the HUD.

As described above, the example embodiments may provide a driver with a more intuitive and realistic driving information guidance experience than an existing navigation environment by controlling a virtual trajectory corresponding to at least a portion of an expected driving path of a vehicle to be displayed using the plurality of lines on the HUD.

Figure 4:
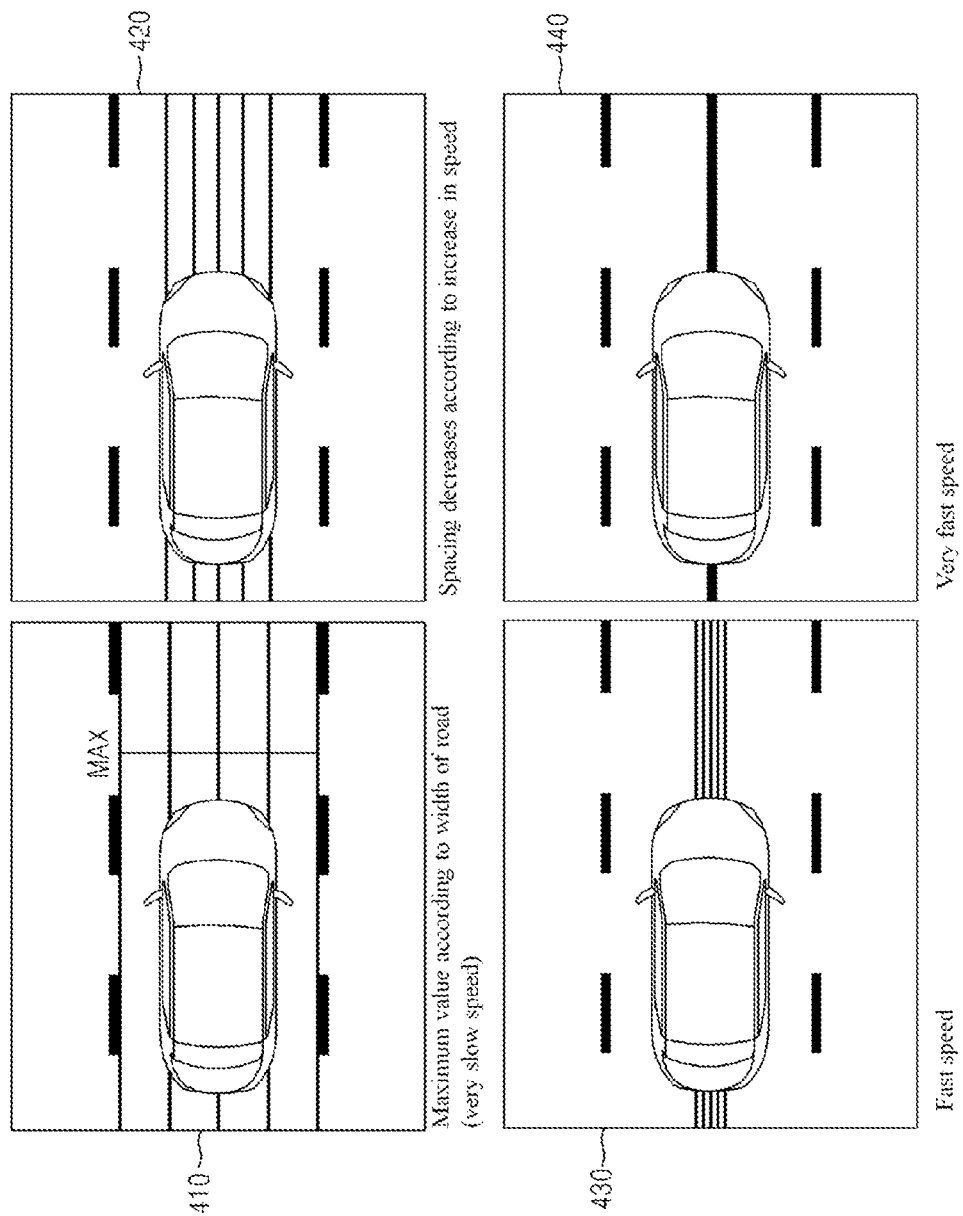
FIG. 4 illustrates an example of adjusting the spacing between a plurality of lines as an AR object based on the driving speed of a vehicle according to an example embodiment.

FIG. 4 illustrates an example of adjusting the spacing between a plurality of lines as an AR object based on the driving speed of a vehicle according to an example embodiment. While FIGS. 1 to 3 illustrate a plurality of lines displayed using AR technology in a real environment, FIG. 4 illustrates an example in which a plurality of lines perceived by the driver through AR technology is virtually expressed in correspondence to a vehicle. That is, the plurality of lines shown in a first example 410, a second example 420, a third example 430, and a fourth example 440 of FIG. 4 may be displayed through a HUD such that a driver of the vehicle may perceive the plurality of lines as in the examples (410 to 440).

Meanwhile, the computer apparatus 130 may control the spacing between the plurality of lines according to the driving speed of the vehicle. Here, the computer apparatus 130 may limit adjustment of the spacing between the plurality of lines such that the plurality of lines is displayed in a lane in which the vehicle is traveling through the HUD. That is, in the example embodiment, the spacing between the plurality of lines may be limited according to the width of a road on which the vehicle travels.

The first example 410 represents an example in which, when the driving speed of the vehicle is less than or equal to a preset minimum speed, the spacing between the plurality of lines is limited such that the spacing between a left end line and a right end line (relative to the driving direction of the vehicle) among the plurality of lines corresponds to the width of the road. Here, the second example 420, the third example 430, and the fourth example 440 represent an example in which, as the driving speed of the vehicle gradually increases beyond the preset minimum speed, the spacing between the plurality of lines gradually decreases and connects to each other accordingly, in a sequential manner. That is, the driver of the vehicle may intuitively perceive the approximate speed of the vehicle through the spacing between the plurality of lines displayed on the HUD.

Figure 5:
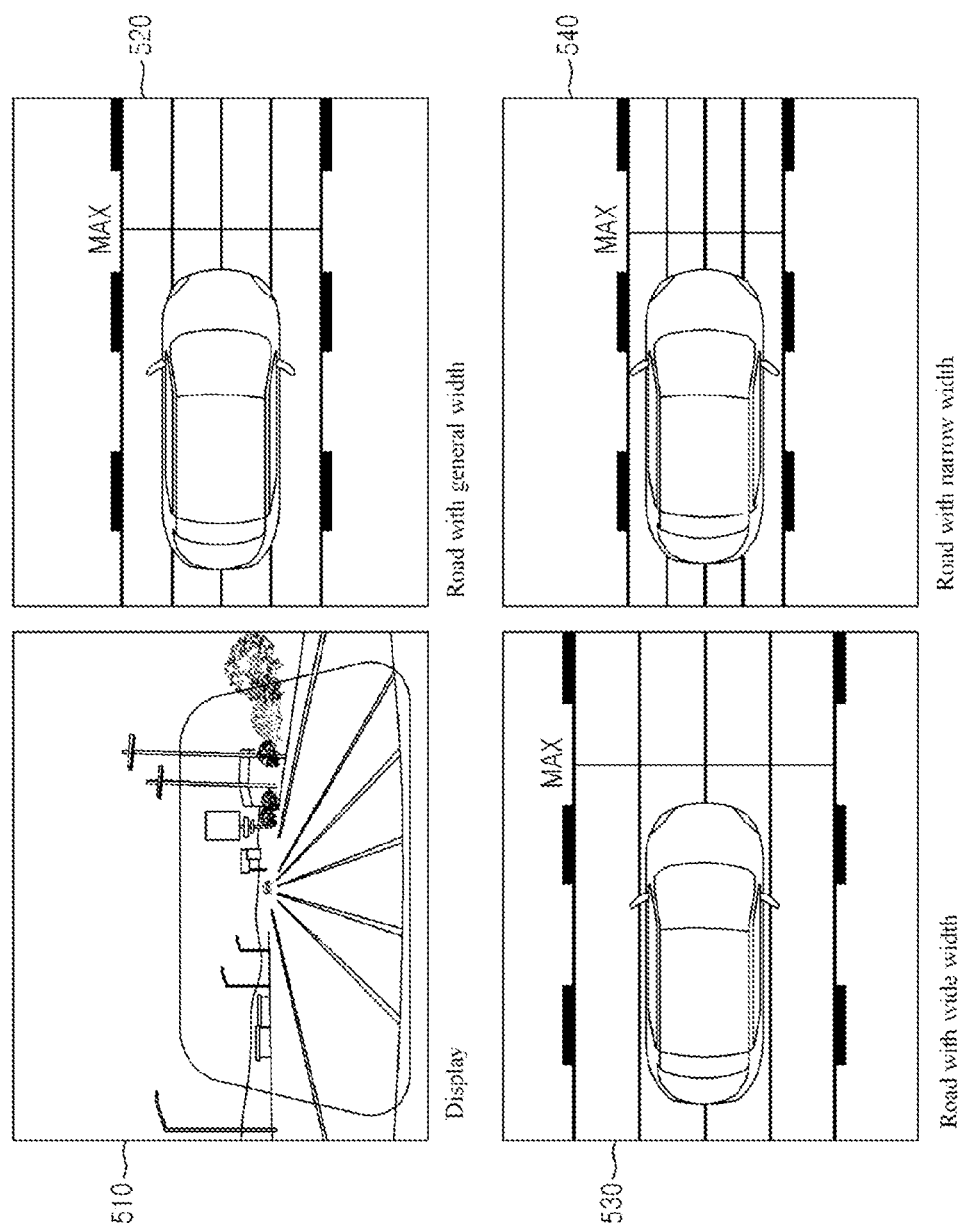
FIG. 5 illustrates an example of adjusting the spacing between a plurality of lines as an AR object based on the width of a perceived road according to an example embodiment.

FIG. 5 illustrates an example of adjusting the spacing between a plurality of lines as an AR object based on the width of a perceived road according to an example embodiment. The width of a road on which a vehicle travels may change. A first example 510 of FIG. 5 represents an example in which a plurality of lines is displayed on a HUD according to the width of the road on which the vehicle travels. Also, referring to a second example 520, a third example 530, and a fourth example 540, the maximum spacing between the plurality of lines may change according to the different widths of the road. The width of the road may be perceived using at least one of an advanced driver assistance system (ADAS) and an HD map.

Figure 6:
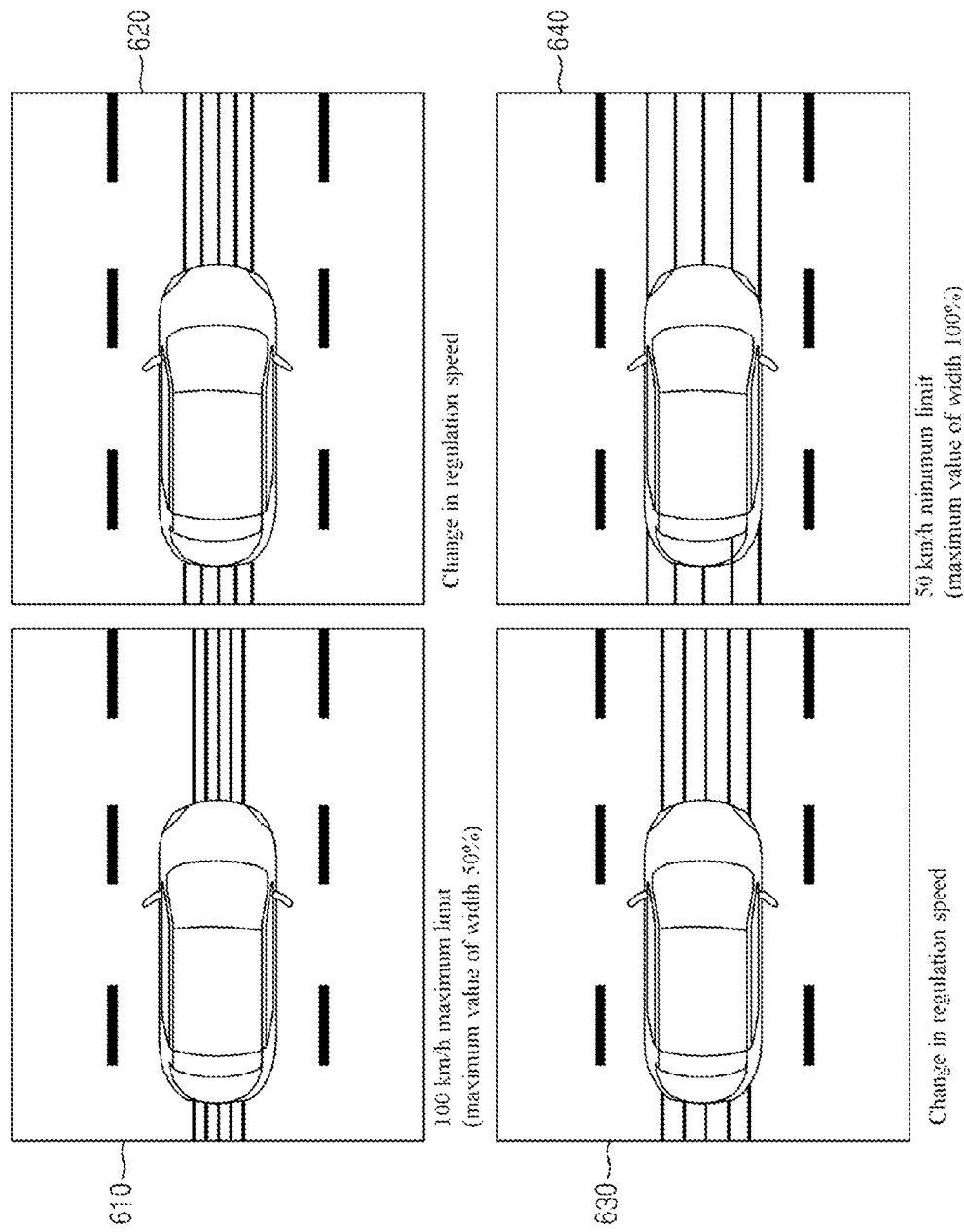
FIG. 6 illustrates an example of adjusting the spacing between a plurality of lines as an AR object based on the driving speed limit of a road on which a vehicle travels according to an example embodiment.

FIG. 6 illustrates an example of adjusting the spacing between a plurality of lines as an AR object based on the driving speed limit of a road on which a vehicle travels according to an example embodiment. A first example 610 of FIG. 6 represents an example of setting the minimum spacing between the plurality of lines based on the maximum driving speed limit of the road on which the vehicle travels. The first example 610 represents an example in which, when the maximum driving speed limit of the road is 100 km/h and the vehicle is traveling at a driving speed of 100 km/h or more, the minimum spacing between the plurality of lines is adjusted such that the distance between a left end line and a right end line among the plurality of lines is 50% of the width of the vehicle. That is, although the driving speed of the vehicle increases, the spacing between the plurality of lines does not further decrease. Here, if the driving speed of the vehicle decreases to be less than 100 km/h, the spacing between the plurality of lines may linearly gradually increase. For example, a second example 620 of FIG. 6 represents an example in which, as the driving speed of the vehicle gradually decreases to be less than 100 km/h from the first example 610, the spacing between the plurality of lines is widened.

The maximum spacing between the plurality of lines may be set based on the minimum driving speed limit of the road on which the vehicle travels. A third example 630 and the fourth example 640 represent an example in which, as the driving speed of the vehicle gradually decreases, the spacing between the plurality of lines gradually increases. Here, the fourth example 640 represents an example in which, when the minimum driving speed limit of a road on which the vehicle travels is 50 km/h and the vehicle travels at the driving speed of less than 50 km/h, the maximum spacing between the plurality of lines is adjusted such that the distance between a left end line and a right end line among the plurality of lines is 100% of the width of the vehicle. That is, although the driving speed of the vehicle becomes slower, the spacing between the plurality of lines is not further widened.

Here, the spacing between the plurality of lines may be controlled to linearly narrow or widen between the maximum spacing and the minimum spacing according to the driving speed of the vehicle. Here, although the maximum spacing and the minimum spacing are set based on the width of the vehicle in the example embodiment of FIG. 6, the maximum spacing may be set such that the plurality of lines does not deviate from the width of the road or may be set such that the spacing between the plurality of lines decreases until the plurality of lines becomes a single line as in the example embodiment of FIG. 4.

Figure 7:
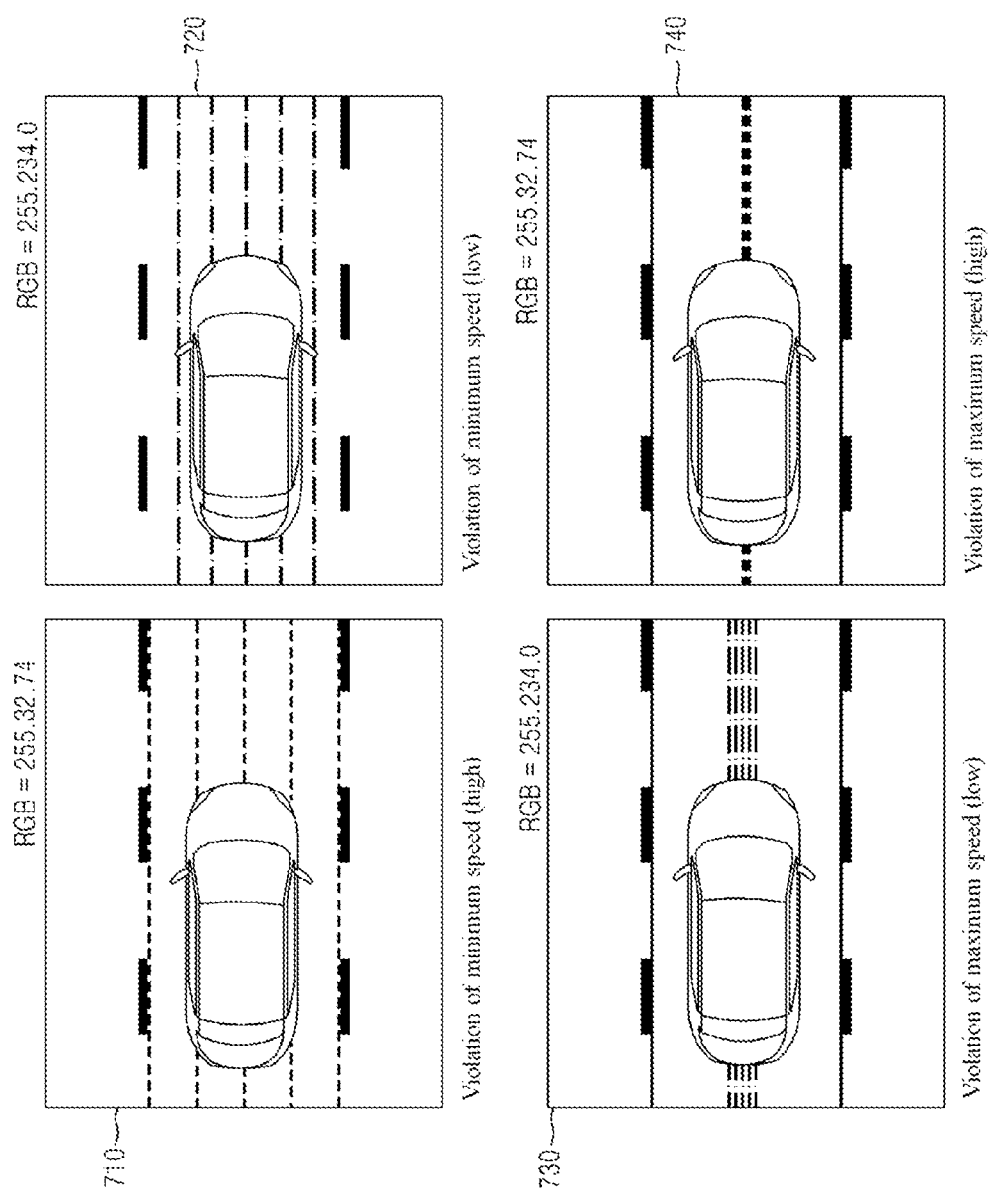
FIG. 7 illustrates an example of displaying a violation of a regulation speed of a road on which a vehicle travels through a color of a plurality of lines as an AR object according to an example embodiment.

FIG. 7 illustrates an example of displaying a regulation speed (speed limit) violation of a road on which a vehicle travels through the colors of a plurality of lines as an AR object according to an example embodiment. A first example 710, a second example 720, a third example 730, and a fourth example 740 of FIG. 4 represent an example in which the spacing between the plurality of lines changes within the width of the road according to the driving speed of the vehicle. Here, when the driving speed of the vehicle violates the regulation speed (i.e., exceeds the speed limit) of the corresponding road, information for notifying the driver of the vehicle of the regulation speed violation may be displayed.

Referring to the first example 710 and the second example 720, to inform the driver of a minor speed violation, the red, green, and blue (RGB) value that represents the plurality of lines may change in gradation from [255.234.0] of the second example 720 according to a low degree of violation to [255.32.74] of the first example 710 according to a high degree of violation.

Likewise, referring to the third example 730 and the fourth example 740, to inform the driver of a more serious speed violation, the RGB value that represents the plurality of lines may change in gradation from [255.234.0] of the third example 730 according to a low degree of violation to [255.32.74] of the fourth example 740 according to a high degree of violation.

For example, the plurality of lines may have 13 gradation colors, such as [0.168.255], [0.228.255], [0.255.144], [96.255.0], [186.255.0], [234.255.0], [255.234.0], [255.218.14], [255.204.68], [255.158.72], [255.122.42], [255.63.32], and [255.32.74], and the color may change in gradation according to the change in the driving speed of the vehicle to provide a visual stability to the driver. Here, the speed at which the color changes in gradation may be adjusted according to the change in the speed of the vehicle. For example, when the corresponding speed of the vehicle changes rapidly, the color of the plurality of lines may change at a relatively fast speed in a gradual manner.

Figure 8:
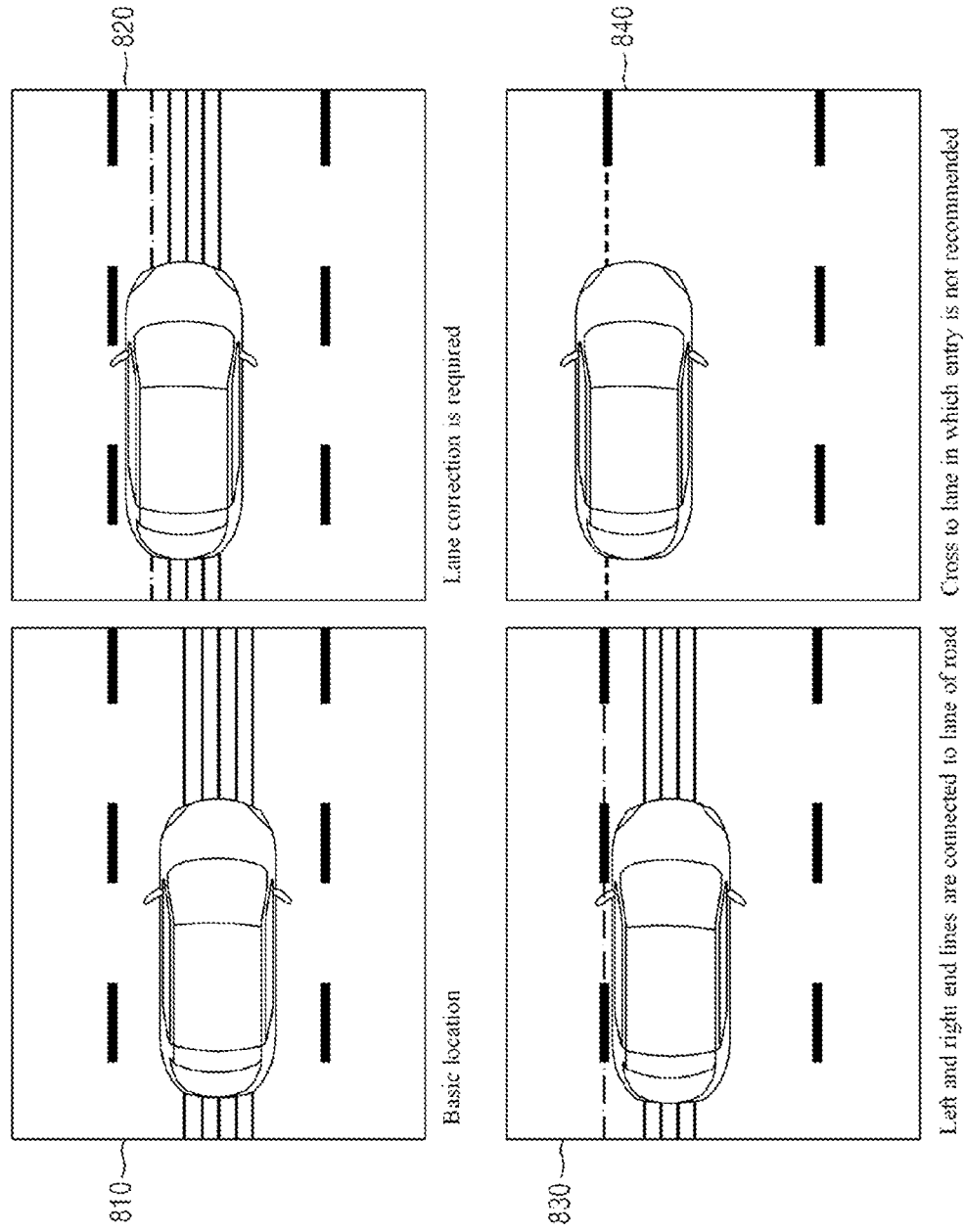
FIG. 8 illustrates an example of warning to prevent a lane departure of a vehicle using a left end line and a right end line among a plurality of lines as an AR object according to an example embodiment.

FIG. 8 illustrates an example of warning to prevent a lane departure of a vehicle using a left end line and a right end line among a plurality of lines as an AR object according to an example embodiment. A first example 810 represents an example in which the vehicle is present at the center of a lane according to an expected driving path. A second example 820 of FIG. 8 represents an example in which, as the vehicle deviates to the left of the lane, the left end line among the plurality of lines is highlighted to inform the driver that a lane correction is required. If the vehicle deviates to the right of the lane, the right end line among the plurality of lines may be highlighted to inform the driver that the lane correction is required. Highlighting of a line may be performed by changing the thickness or the color of the line. Here, a change in the thickness of the line may correspond to a change in the shape of the line.

A third example 830 of FIG. 8 represents an example in which the left end line among the plurality of lines is overlapped with the left line of the lane to inform the driver that the lane correction is required as the vehicle deviates to the left. If the vehicle deviates to the right of the lane, the right end line among the plurality of lines may be overlapped with the right line of the lane to inform the driver that the lane correction is required. A fourth example 840 of FIG. 8 represents an example in which all of the plurality of lines are connected to the left line as the vehicle crosses to a left lane in which entry is not recommended. If the vehicle crosses to the adjacent left lane in which entry is not recommended, all of the plurality of lines may overlap with the left line of the current lane. As described above, a computer apparatus 130 may control the plurality of lines to be displayed in association with the lane in which the vehicle is traveling according to the expected driving path and may control information about at least one of a lane bias or drift and a lane departure of the vehicle to be displayed using the left end line or the right end line among the plurality of lines.

Figure 9:
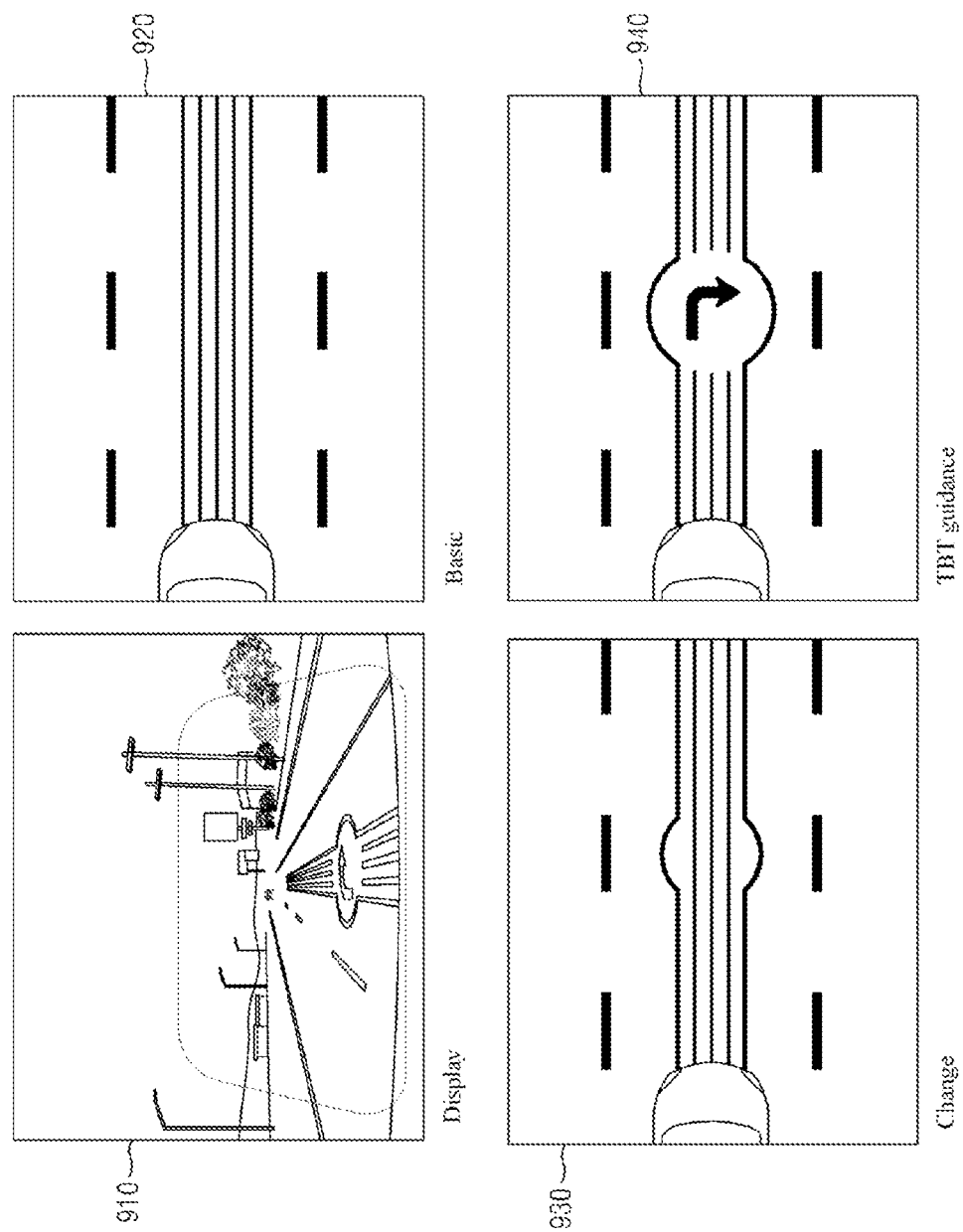
FIG. 9 illustrates an example of displaying turn-by-turn (TBT) information according to an example embodiment.

FIG. 9 illustrates an example of displaying turn-by-turn (TBT) information according to an example embodiment. The example embodiment represents an example of displaying TBT information through a plurality of lines displayed as if the plurality of lines is present on a floor of a road on which a vehicle travels using AR technology. A first example 910 of FIG. 9 represents an example in which, with the shape of the plurality of lines being changed, an arbitrary space is formed between the left end and right end lines and TBT information is displayed in the formed space. Here, a second example 920, a third example 930, and a fourth example 940 of FIG. 9 represent an example of a process of displaying TBT information with the space being formed through the plurality of lines. More specifically, the second example 920 illustrates all the lines being matched to the trajectory of the road immediately prior to the forming of a space. The third example 930 shows the left end and right end lines being reconfigured or reshaped (curved) to form two opposite areas of a circular space, and the fourth example 940 illustrates the lines between the left end and right end lines being discontinued to form the remaining areas of the circular space. The fourth example 940 of FIG. 9 represents an example in which TBT information (a right-turn arrow) corresponding to a right turn is displayed in the circular space created by the plurality of lines.

Figure 10:
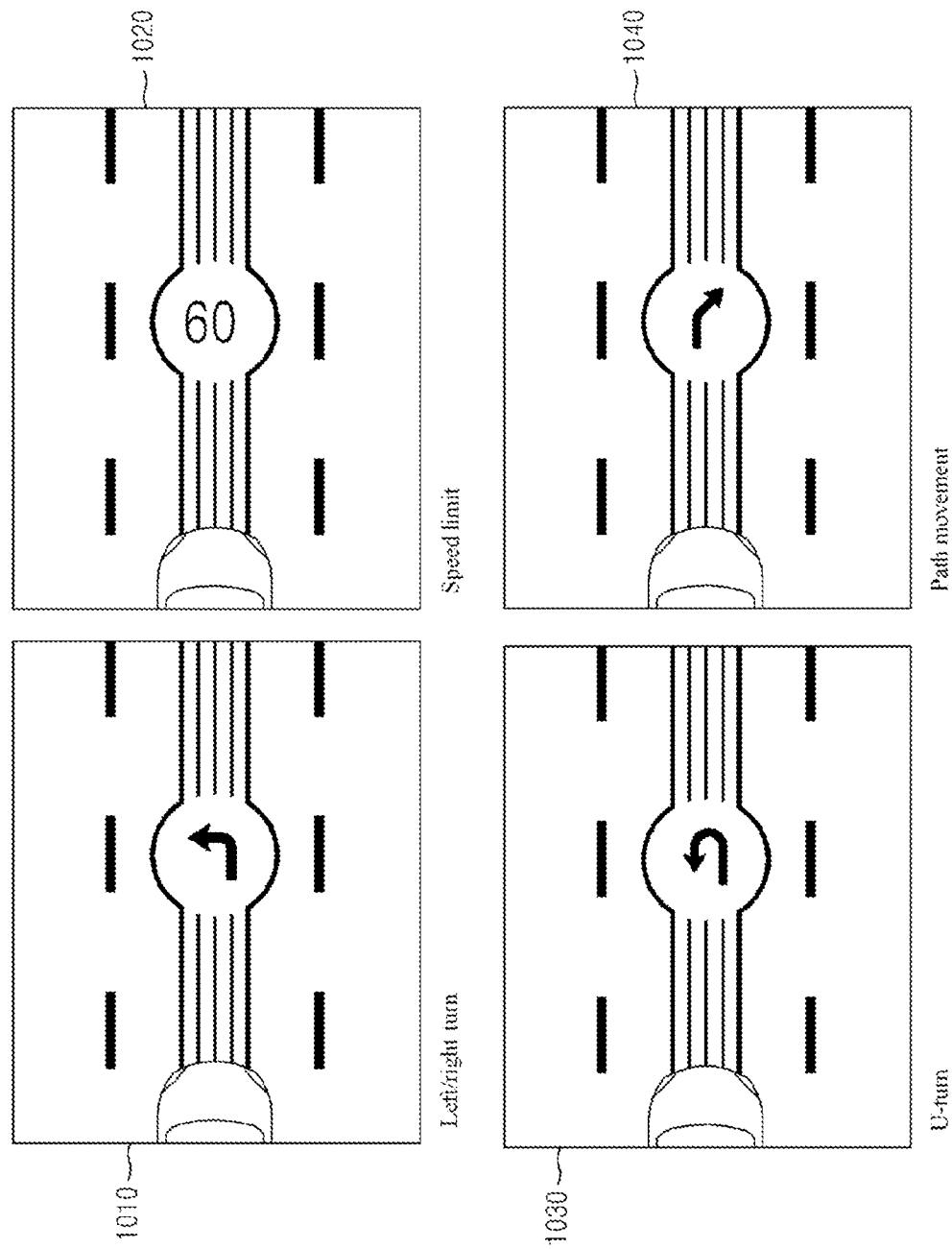
FIG. 10 illustrates examples of TBT information displayed through a plurality of lines according to an example embodiment.

FIG. 10 illustrates examples of TBT information displayed through a plurality of lines according to an example embodiment. A first example 1010 of FIG. 10 represents an example in which TBT information (a left-turn arrow) corresponding to a left turn is displayed in a space formed between the plurality of lines, and a second example 1020 of FIG. 10 represents an example in which TBT information corresponding to a speed limit is displayed in the space formed between the plurality of lines. Also, a third example 1030 of FIG. 10 represents an example in which TBT information (a U-turn arrow) corresponding to a U-turn is displayed in the space formed between the plurality of lines, and a fourth example 1040 of FIG. 10 represents an example in which TBT information corresponding to a path movement (a lane change) is displayed in the space formed between the plurality of lines.

As described above, by displaying TBT information through the space created between the plurality of lines with the shape of the plurality of lines being changed or parts of the plurality of lines removed as the AR object, it is possible to produce the TBT information in a more spatial sense and to assist a driver to intuitively understand the TBT information.

Figure 11:
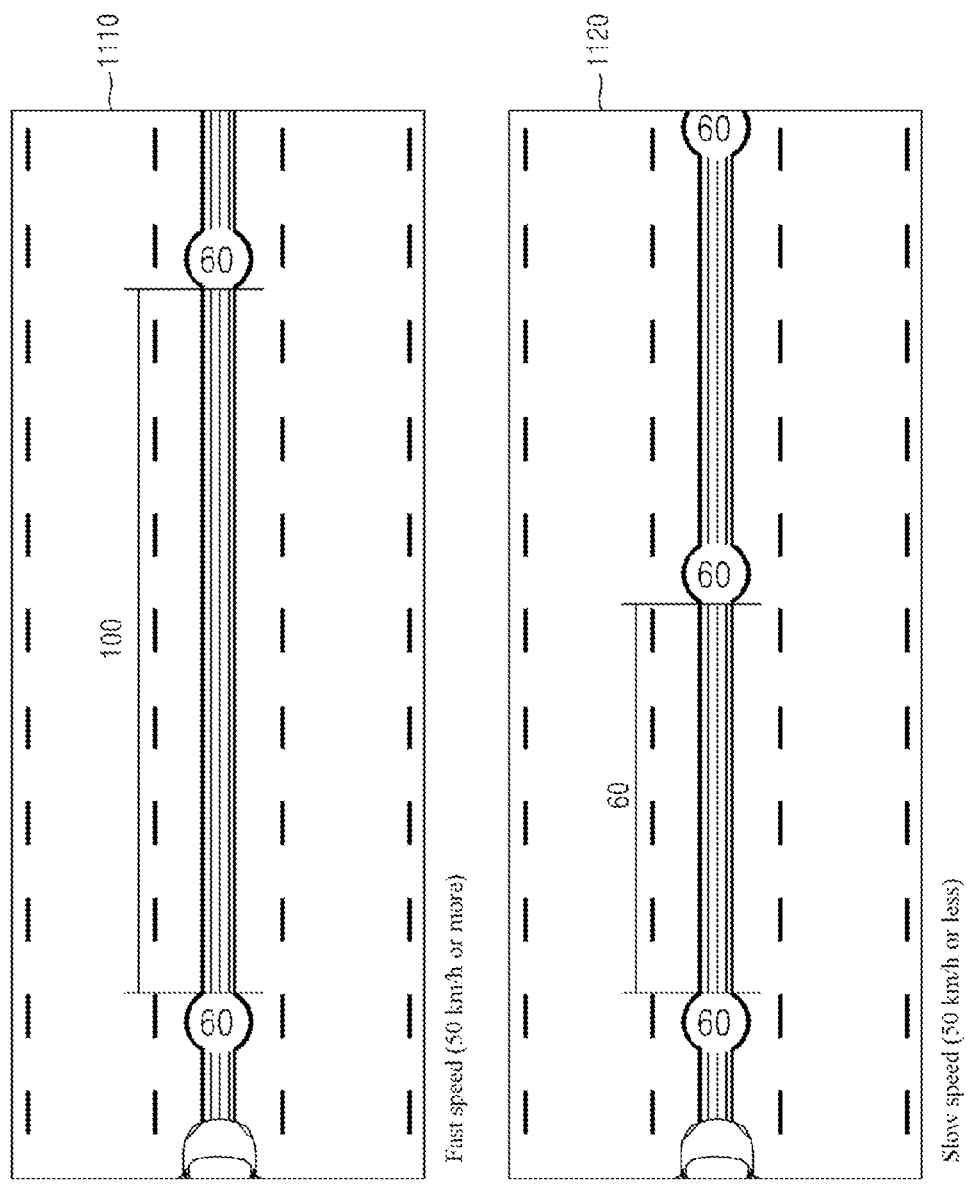
FIG. 11 illustrates an example of adjusting the interval at which TBT information is displayed based on the driving speed of a vehicle according to an example embodiment.

FIG. 11 illustrates an example of adjusting an interval at which TBT information is displayed based on the driving speed of a vehicle according to an example embodiment. A first example 1110 and a second example 1120 of FIG. 11 show that the same TBT information shown to a driver may differ according to the driving speed of the vehicle. For example, the first example 1110 and the second example 1120 of FIG. 11 represent an example in which the interval of TBT information decreases according to the decrease in the driving speed of the vehicle.

In this case, it is possible to provide the driver with an experience that TBT information is displayed at similar intervals regardless of the driving speed of the vehicle. An interval at which the TBT information is displayed may have an appropriate value that varies according to the driving speed of the vehicle based on a feature or type of the road (e.g., a highway, a city street, a country road, etc.). For example, even for the driving speed of the same vehicle, the interval at which the TBT information is displayed on a highway may be greater than that on a country road. Such an appropriate value may be experimentally determined through actual road driving.

Figure 12:
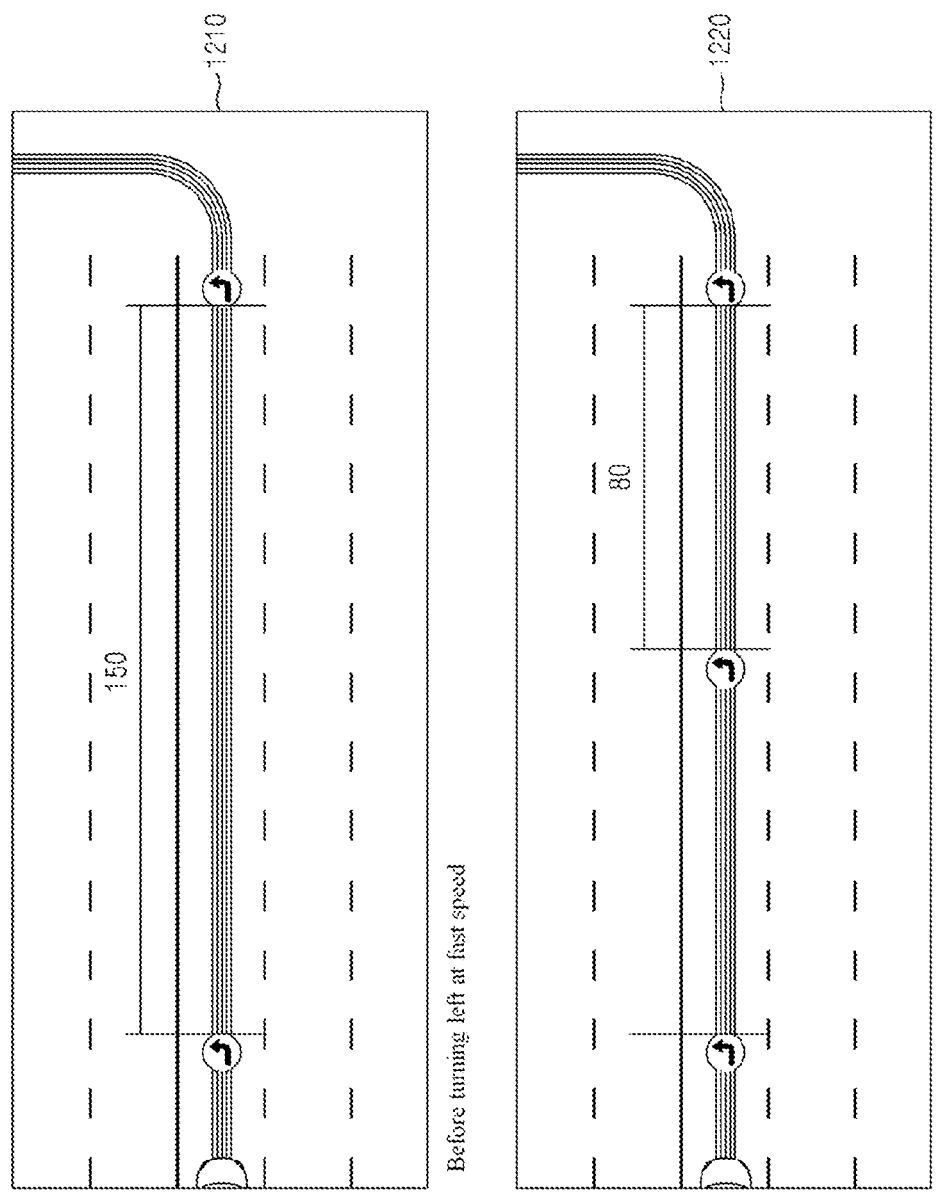
FIG. 12 illustrates an example of adjusting the number of times TBT information is displayed based on the driving speed of a vehicle according to an example embodiment.

FIG. 12 illustrates an example of adjusting the number of times TBT information is displayed based on a driving speed of a vehicle according to an example embodiment. A first example 1210 and a second example 1220 of FIG. 12 show that the number of times the same TBT information is displayed may vary according to the driving speed of the vehicle. For example, while the first example 1110 of FIG. 12 represents an example of displaying TBT information twice in a situation in which the driving speed of the vehicle is relatively fast, the second example 1120 represents an example of displaying TBT information three times in a situation in which the driving speed of the vehicle is relatively slow.

Also, depending on example embodiments, a point in time at which TBT information is initially displayed may differ according to the driving speed of the vehicle. For example, in a situation in which a left turn is required at an intersection, if the driving speed of the vehicle is relatively slow, TBT information may be displayed 100 to 150 m before, and if the driving speed of the vehicle is relatively fast, the TBT information may be displayed 200 to 300 m before, such that a driver may perceive a left-turning situation more quickly. As described above, a method of displaying TBT information may be optimized according to the driving environment of the vehicle.

Figure 13:
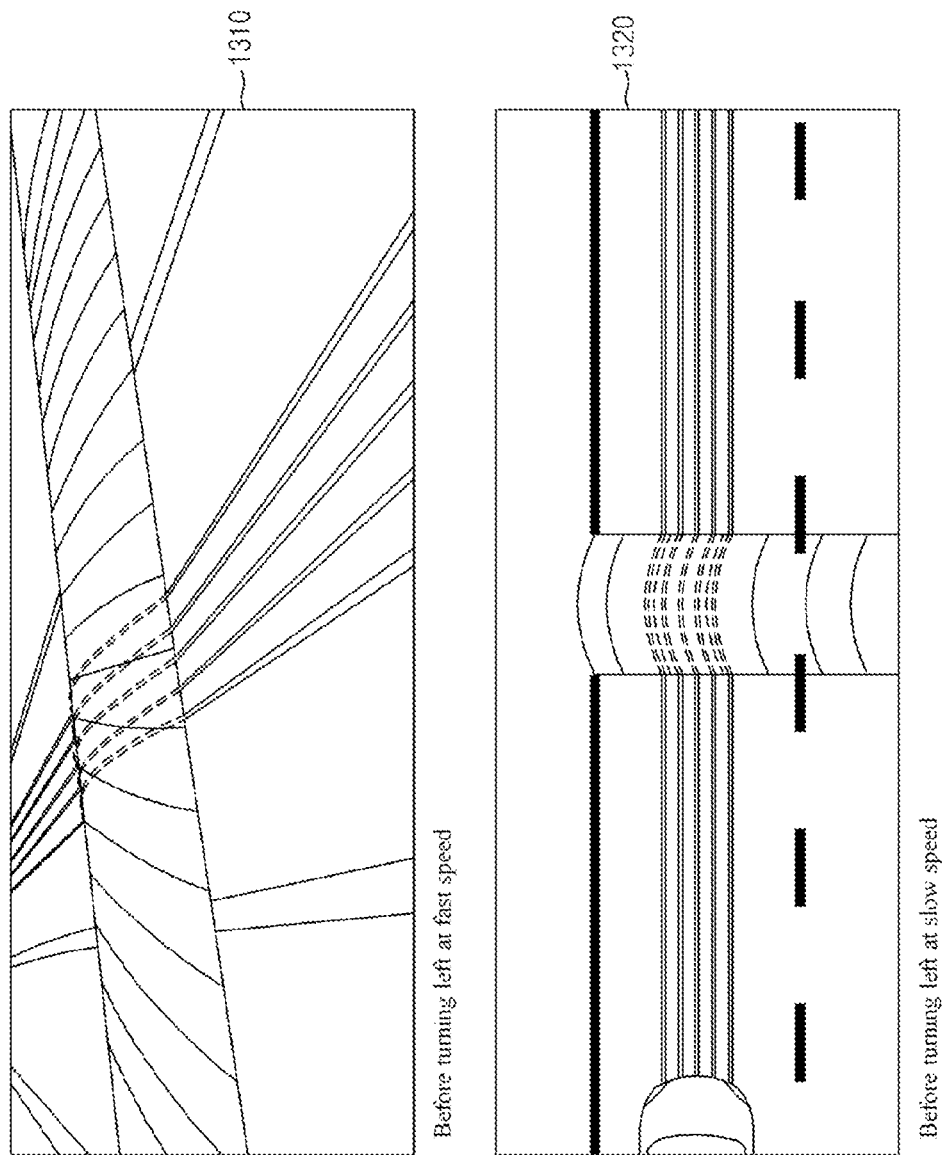
FIG. 13 illustrates an example of displaying a plurality of lines as an AR object along a curvature of a road according to an example embodiment.

FIG. 13 illustrates an example of displaying a plurality of lines as an AR object along a vertical curvature or deflection of a road according to an example embodiment. A first example 1310 and a second example 1320 of FIG. 13 represent an example of adjusting the curvature of the plurality of lines according to a speed bump. For example, a computer apparatus 130 may recognize the vertical curvature of a road on which a vehicle travels based on information of an HD map about the road on which the vehicle travels and an output value of a sensor included in the vehicle.

Here, the computer apparatus 130 may control at least one of the shape and the color of the plurality of lines displayed on a HUD to change according to the recognized vertical curvature of the road. Although FIG. 13 illustrates the plurality of lines that changes according to the vertical curvature of the road through dotted lines, a portion that changes in a curved shape according to the curvature of the road may be highlighted by changing the color and the shape, such that drivers may easily perceive the deflection on the road.

Figure 14:
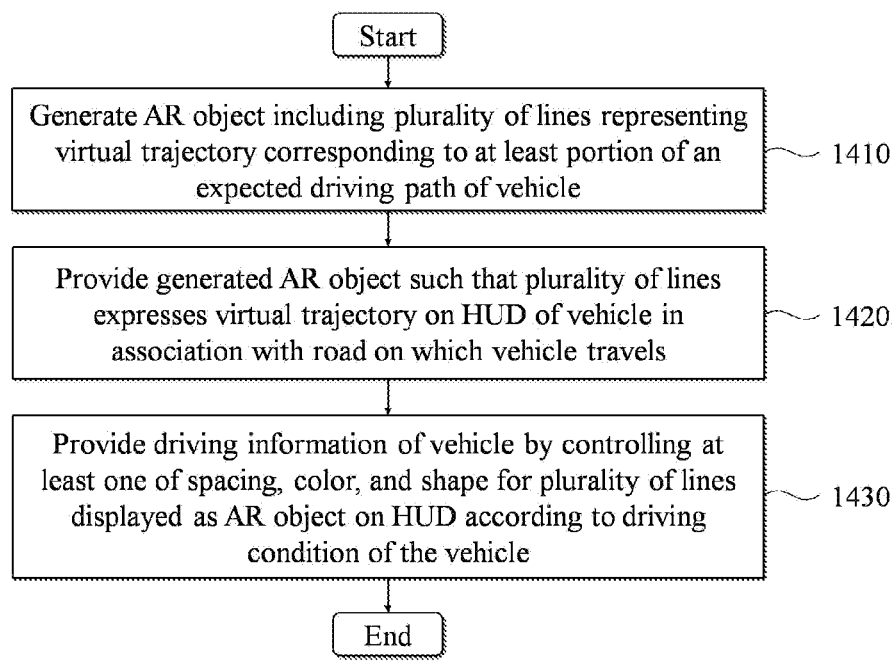
FIG. 14 is a flowchart illustrating an example of a driving information guidance method according to an example embodiment.
Figure 15:
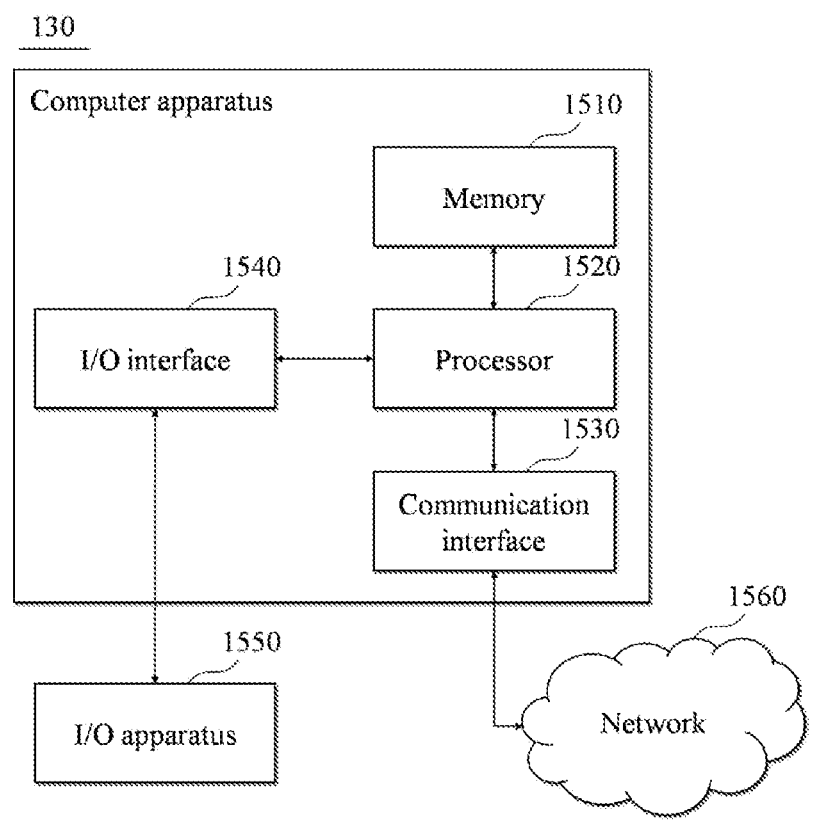
FIG. 15 is a block diagram illustrating an example of a computer apparatus according to an example embodiment.
Figure 16:
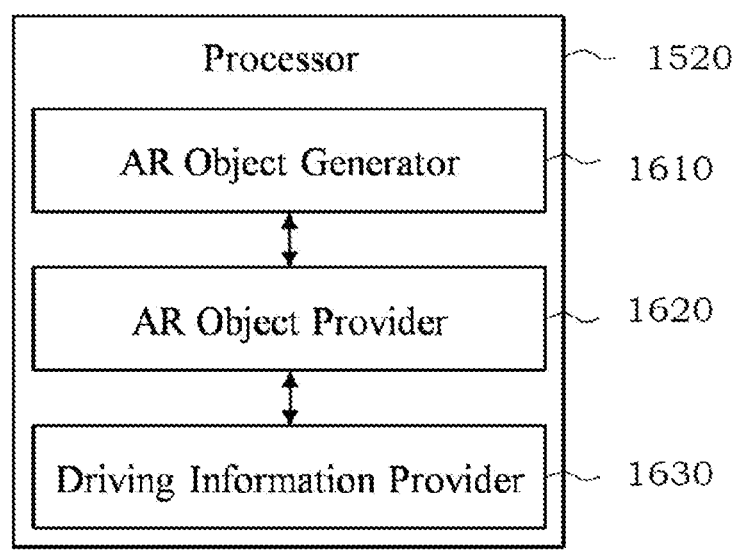
FIG. 16 is a block diagram illustrating an example of a processor according to an example embodiment.

FIG. 14 is a flowchart illustrating an example of a driving information guidance method according to an example embodiment. A driving guidance information method according to the example embodiment may be performed by at least one computer apparatus 130 included in a vehicle. In this case, the at least one processor included in the computer apparatus 130 may be implemented to execute a control instruction according to a code of at least one program or a code of an OS loaded to a memory further included in the computer apparatus 130. Here, the at least one processor may control the computer apparatus 130 to perform operations 1410 to 1430 included in the method of FIG. 14 in response to the control instruction provided from the code loaded to the memory of the computer apparatus 130. For example, the computer apparatus 130 may include a processor 1520 as shown in FIG. 15. The processor 1520 may include an AR object generator 1610, an AR object provider 1620, and a driving information provider 1630 as shown in FIG. 16.

In operation 1410, the AR object generator 1610 may generate an AR object including a plurality of lines representing a virtual trajectory corresponding to at least a portion of an expected driving path of a vehicle. Here, the AR object generator 1610 may generate the plurality of lines to express a virtual trajectory matching the road on which the vehicle travels when the plurality of lines is displayed on a HUD, using information of an HD map about the road on which the vehicle travels. For example, five lines representing the virtual trajectory are described with reference to FIGS. 1 to 3.

In operation 1420, the AR object provider 1620 may provide the generated AR object such that the plurality of lines expresses the virtual trajectory on the HUD of the vehicle in association with the road on which the vehicle travels. For example, an example of displaying the virtual trajectory through which the vehicle is to travel through five lines on the HUD 110 is described above with reference to FIGS. 1 to 3. In this case, the AR object provider 1620 may provide the AR object to the HUD of the vehicle such that the HUD may display the AR object to display the virtual trajectory in association with the road accordingly.

In operation 1430, the driving information provider 1630 may provide driving information of the vehicle by controlling at least one of the spacing, the color, and the shape of the plurality of lines displayed as the AR object on the HUD according to the driving condition of the vehicle.

In an example embodiment, the computer apparatus 130 may control the spacing between the plurality of lines according to the driving speed of the vehicle. For example, the computer apparatus 130 may control the spacing between the plurality of lines to be relatively narrowed according to an increase in the driving speed of the vehicle and to be relatively widened according to a decrease in the driving speed of the vehicle. An example in which the spacing between the plurality of lines is relatively narrowed according to an increase in the driving speed of the vehicle is described above with reference to FIG. 4.

In another example embodiment, the computer apparatus 130 may limit the adjustment of the spacing between the plurality of lines such that the plurality of lines is displayed within a lane in which the vehicle is traveling on the HUD. For example, the computer apparatus 130 may control the spacing between the plurality of lines based on the width of a perceived road using an ADAS and an HD map. An example of recognizing the width of the road and controlling the spacing between the plurality of lines such that left and right end lines among the plurality of lines do not cross left and right lines of the road is described above with reference to the example embodiment of FIG. 5.

In still another example embodiment, the computer apparatus 130 may dynamically set a driving speed that matches the maximum spacing or the minimum spacing between the plurality of lines according to the maximum driving speed limit or the minimum driving speed limit of the road on which the vehicle travels. Here, the computer apparatus 130 may linearly or nonlinearly control the spacing between the plurality of lines according to the driving speed of the vehicle based on the driving speed that matches the maximum spacing or the minimum spacing. For example, an example of setting the maximum spacing or the minimum spacing for the plurality of lines based on the width of the vehicle according to the maximum driving speed limit or the minimum driving speed limit of the road and linearly adjusting the spacing between the plurality of lines according to the driving speed that matches the maximum spacing or the minimum spacing is described above with reference to the example embodiment of FIG. 6.

In still another example embodiment, when the driving speed of the vehicle violates the regulation speed (speed limit) of the road on which the vehicle travels, the computer apparatus 130 may control displaying of the plurality of lines on the HUD such that the color of the plurality of lines changes. An example in which the color of the plurality of lines may change in gradation is described above with reference to the example embodiment of FIG. 7. For example, a plurality of colors between the first color and the second color may be predefined in gradation. In this case, the computer apparatus 130 may control the color of the plurality of lines to change in gradation from the first color to the second color through the plurality of colors and, here, may adjust the speed at which the color changes in gradation according to the change in the speed of the vehicle.

In still another example embodiment, the computer apparatus 130 may control the plurality of lines to be displayed in association with a lane in which the vehicle is traveling according to the expected driving path, and, here, may control displaying of the plurality of lines such that information about at least one of a lane bias and a lane departure of the vehicle is displayed using a left end line or a right end line among the plurality of lines. An example of using the left end line or the right end line to warn a driver of the lane bias or the lane departure of the vehicle is described above with reference to FIG. 8.

In still another example embodiment, when displaying TBT information according to the driving of the vehicle, the computer apparatus 130 may form an arbitrary space between the plurality of lines by changing the shape of at least one of the plurality of lines and may control displaying of the plurality of lines such that the TBT information is displayed in the formed space. For example, an example of displaying the TBT information in the space formed between the plurality of lines is described above with reference to FIGS. 9 and 10. Here, the computer apparatus 130 may dynamically set at least one of the spacing between spaces formed between the plurality of lines and the number of spaces according to the driving speed of the vehicle to display the TBT information. For example, an example of adjusting the interval between spaces according to the driving speed of the vehicle is described above with reference to FIG. 11 and an example of adjusting the number of spaces formed between the plurality of lines to display TBT information according to the driving speed of the vehicle is described above with reference to FIG. 12.

In still another example embodiment, the computer apparatus 130 may control displaying of the plurality of lines such that least one of the shape and the color for the plurality of lines changes according to a vertical curvature of the road on which the vehicle travels, which is measured based on information of an HD map about the road on which the vehicle travels and the output value of a sensor included in the vehicle. An example of changing and thereby expressing the shape and the color of the plurality of lines according to a vertical curvature of the road formed due to a speed bump is described above with reference to FIG. 13.

FIG. 15 is a diagram illustrating an example of a computer apparatus according to an example embodiment, and FIG. 16 is a diagram illustrating an example of a processor according to an example embodiment. Referring to FIG. 15, a computer apparatus 130 may include a memory 1510, a processor 1520, a communication interface 1530, and an input/output (I/O) interface 1540. The memory 1510 may include a permanent mass storage device, such as random access memory (RAM), read only memory (ROM), and disk drive as a computer-readable record medium. Here, the permanent mass storage device, such as ROM and disk drive, may be included in the computer apparatus 130 as a permanent storage device separate from the memory 1510.

Also, an OS and at least one program code may be stored in the memory 1510. Such software components may be loaded to the memory 1510 from another computer-readable record medium separate from the memory 1510. The other computer-readable record medium may include a computer-readable record medium such as a floppy drive, a disk, a tape, a DVD/CD-ROM drive, a memory card, etc. According to other example embodiments, the software components may be loaded to the memory 1510 through the communication interface 1530 instead of the computer-readable record medium. For example, the software components may be loaded to the memory 1510 of the computer apparatus 130 based on a computer program installed by files received over a network 1560.

The processor 1520 may be configured to process instructions of a computer program by performing basic arithmetic operations, logic operations, and I/O operations. The instructions may be provided from the memory 1510 or the communication interface 1530 to the processor 1520. For example, the processor 1520 may be configured to execute received instructions in response to a program code stored in the storage device such as the memory 1510.

The communication interface 1530 may provide a function for communication between the computer apparatus 130 and other apparatuses (e.g., the aforementioned storage devices) over the network 1560. For example, the processor 1520 of the computer apparatus 130 may transfer a request or an instruction created based on a program code stored in the storage device such as the memory 1510, data, a file, etc., to the other apparatuses over the network 1560 under control of the communication interface 1530. Inversely, a signal or an instruction, data, a file, etc., from another apparatus may be received at the computer apparatus 130 through the communication interface 1530 of the computer apparatus 130. For example, a signal or an instruction, data, etc., received through the communication interface 1530 may be transferred to the processor 1520 or the memory 1510, and a file, etc., may be stored in a storage medium (e.g., the permanent storage device) further includable in the computer apparatus 130.

The I/O interface 1540 may be a device used for interfacing with an I/O apparatus 1550. For example, an input device of the I/O apparatus 1550 may include a device, such as a microphone, a keyboard, a mouse, etc., and an output device of the I/O apparatus 1550 may include a device, such as a display, a speaker, etc. As another example, the I/O interface 1540 may be a device for interfacing with an apparatus in which an input function and an output function are integrated into a single function, such as a touchscreen. The I/O apparatus 1550 may be configured as a single device with the computer apparatus 130.

Also, in other example embodiments, the computer apparatus 130 may include great or less number of components than the number of components shown in FIG. 15. For example, the computer apparatus 130 may include at least a portion of the I/O apparatus 1550, or may further include other components, for example, a transceiver, a database (DB), and the like.

As described above, according to some example embodiments, it is possible to guide a variety of information about driving of a vehicle using an AR object corresponding to a driving path displayed on a HUD more intuitively and realistically than an existing navigation environment.

The systems or apparatuses described herein may be implemented using hardware components, software components, or a combination thereof. For example, the apparatuses and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may include, alone or in combination with program instructions, a data file, a data structure, and the like. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A driving information guidance method performed by at least one processor of a computer apparatus, the method comprising:
   generating an augmented reality (AR) object including a plurality of lines representing a virtual trajectory corresponding to at least a portion of an expected driving path of a vehicle;
   providing the generated AR object such that the plurality of lines expresses the virtual trajectory on a head-up display of the vehicle in association with a road on which the vehicle travels; and
   providing driving information of the vehicle by controlling at least one of a spacing, a color, and a shape of the plurality of lines displayed as the AR object on the head-up display according to a driving condition of the vehicle,
   wherein the providing of the driving information of the vehicle comprises:
   dynamically setting a driving speed that matches a maximum spacing or a minimum spacing between the plurality of lines according to a maximum driving speed limit or a minimum driving speed limit of the road on which the vehicle travels, and
   linearly or nonlinearly controlling a spacing between the plurality of lines according to a driving speed of the vehicle based on the driving speed that matches the maximum spacing or the minimum spacing.

2. The driving information guidance method of claim 1, wherein the generating of the AR object comprises generating the plurality of lines to express the virtual trajectory matching the road on which the vehicle travels when the plurality of lines is displayed on the head-up display, using information of a high definition (HD) map about the road on which the vehicle travels.

3. The driving information guidance method of claim 1, wherein the providing of the driving information of the vehicle comprises controlling displaying of the plurality of lines such that the spacing between the plurality of lines is relatively narrowed according to an increase in a driving speed of the vehicle and the spacing between the plurality of lines is relatively widened according to a decrease in the driving speed of the vehicle.

4. The driving information guidance method of claim 1, wherein the providing of the driving information of the vehicle comprises controlling adjustment of the spacing between the plurality of lines such that the plurality of lines is displayed within a lane in which the vehicle is traveling on the head-up display.

5. The driving information guidance method of claim 1, wherein the providing of the driving information of the vehicle comprises controlling the spacing between the plurality of lines based on a width of a perceived road using at least one of an advanced driver assistance system (ADAS) and an HD map.

6. The driving information guidance method of claim 1, wherein the providing of the driving information of the vehicle comprises controlling displaying of the plurality of lines such that a color of the plurality of lines changes when a driving speed of the vehicle violates a regulation speed of the road on which the vehicle travels.

7. The driving information guidance method of claim 6, wherein a plurality of colors between a first color and a second color is pre-defined in gradation, and the providing of the driving information of the vehicle comprises controlling the color of the plurality of lines to change in gradation from the first color to the second color through the plurality of colors and adjusting a speed at which the color changes in gradation according to a change speed of the driving condition of the vehicle.

8. The driving information guidance method of claim 1, wherein the providing of the driving information of the vehicle comprises controlling the plurality of lines to be displayed in association with a lane in which the vehicle is traveling according to the expected driving path, and controlling displaying of the plurality of lines such that information about at least one of a lane bias and a lane departure of the vehicle is displayed using a left end line or a right end line among the plurality of lines.

9. The driving information guidance method of claim 1, wherein the providing of the driving information of the vehicle comprises forming an arbitrary space between the plurality of lines by changing a shape of at least one of the plurality of lines and controlling displaying of the plurality of lines such that turn-by-turn (TBT) information is displayed in the formed space, when displaying the TBT information according to the driving condition of the vehicle.

10. The driving information guidance method of claim 9, wherein the providing of the driving information of the vehicle comprises dynamically setting at least one of a spacing between spaces formed between the plurality of lines and a number of spaces according to the driving speed of the vehicle to display the TBT information.

11. The driving information guidance method of claim 1, wherein the providing of the driving information of the vehicle comprises controlling displaying of the plurality of lines such that least one of the shape and the color for the plurality of lines changes according to a vertical curvature of the road on which the vehicle travels, which is measured based on information of an HD map about the road on which the vehicle travels and an output value of a sensor included in the vehicle.

12. A non-transitory computer-readable recording medium storing a computer program configured to be executed by a computer apparatus for performing the driving information guidance method of claim 1.

13. A computer apparatus comprising:
a memory configured to store an instruction executable on a computer; and
at least one processor configured to execute the instruction,
wherein the at least one processor is configured to cause the computer apparatus to,
generate an augmented reality (AR) object including a plurality of lines representing a virtual trajectory corresponding to at least a portion of an expected driving path of a vehicle,
provide the generated AR object such that the plurality of lines expresses the virtual trajectory on a head-up display of the vehicle in association with a road on which the vehicle travels, and
provide driving information of the vehicle by controlling at least one of a spacing, a color, and a shape of the plurality of lines displayed as the AR object on the head-up display according to a driving condition of the vehicle,
wherein the at least one processor is configured to cause the computer apparatus to dynamically set a maximum spacing between the plurality of lines according to at least one of a maximum driving speed limit and a minimum driving speed limit of the road on which the vehicle travels and to linearly control a spacing between the plurality of lines according to a driving speed of the vehicle within the maximum spacing.

14. The computer apparatus of claim 13, wherein the at least one processor is configured to cause the computer apparatus to generate the plurality of lines to express the virtual trajectory matching the road on which the vehicle travels when the plurality of lines is displayed on the head-up display, using information of a high definition (HD) map about the road on which the vehicle travels.

15. The computer apparatus of claim 13, wherein the at least one processor is configured to cause the computer apparatus to control a spacing between the plurality of lines according to a driving speed of the vehicle.

16. The computer apparatus of claim 13, wherein the at least one processor is configured to cause the computer apparatus to control displaying of the plurality of lines such that the spacing between the plurality of lines is relatively narrowed according to an increase in a driving speed of the vehicle and the spacing between the plurality of lines is relatively widened according to a decrease in the driving speed of the vehicle.

17. A driving information guidance method performed by at least one processor of a computer apparatus, the method comprising:
generating an augmented reality (AR) object including a plurality of lines representing a virtual trajectory corresponding to at least a portion of an expected driving path of a vehicle;
providing the generated AR object such that the plurality of lines expresses the virtual trajectory on a head-up display of the vehicle in association with a road on which the vehicle travels; and
providing driving information of the vehicle by controlling at least one of a spacing, a color, and a shape of the plurality of lines displayed as the AR object on the head-up display according to a driving condition of the vehicle,
wherein the providing of the driving information of the vehicle comprises forming an arbitrary space between the plurality of lines by changing a shape of at least one of the plurality of lines and controlling displaying of the plurality of lines such that turn-by-turn (TBT) information is displayed in the formed space, when displaying the TBT information according to the driving condition of the vehicle.

18. The driving information guidance method of claim 17, wherein the providing of the driving information of the vehicle comprises dynamically setting at least one of a spacing between spaces formed between the plurality of lines and a number of spaces according to the driving speed of the vehicle to display the TBT information.

* * * * *